United States Patent
Dettinger et al.

(10) Patent No.: US 7,203,677 B1
(45) Date of Patent: Apr. 10, 2007

(54) CREATION OF DURATION EPISODES FROM SINGLE TIME EVENTS

(75) Inventors: Richard D. Dettinger, Rochester, MN (US); Judy I. Djugash, Rochester, MN (US); Daniel P. Kolz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/326,562

(22) Filed: Jan. 5, 2006

(51) Int. Cl.
*G06F 17/00* (2006.01)
*G06F 12/00* (2006.01)

(52) U.S. Cl. .......................... 707/3; 707/1
(58) Field of Classification Search .............. 707/1, 707/3, 4, 5, 9, 2, 10, 100
See application file for complete search history.

(56) References Cited

U.S. PATENT DOCUMENTS

| | | | |
|---|---|---|---|
| 6,725,227 B1 | 4/2004 | Li | |
| 2004/0193567 A1* | 9/2004 | Dettinger et al. | 707/1 |
| 2004/0210579 A1* | 10/2004 | Dettinger et al. | 707/9 |
| 2004/0225641 A1* | 11/2004 | Dettinger et al. | 707/3 |

OTHER PUBLICATIONS

Dettinger, et al., U.S. Appl. No. 10/083,075, filed Feb. 26, 2002, "Application Portability and Extensibility Through Database Schema and Query Abstraction" (ROC920020044US1).

Dettinger, et al., U.S. Appl. No. 10/403,356, filed Mar. 31, 2003, "Dealing with Composite Data Through Data Model Entities"(ROC920030008US1).

Dettinger, et al., U.S. Appl. No. 11/005,418, filed Dec. 6, 2004, "Abstract Query Plan" (ROC920040198US1).

* cited by examiner

*Primary Examiner*—Sam Rimell
(74) *Attorney, Agent, or Firm*—Patterson & Sheridan, LLP

(57) ABSTRACT

One embodiment of the invention provides method for processing a database query that includes an episode-based condition. The method includes determining the time periods associated with one or more duration episodes by analyzing a set of data reflecting values for the episode-based condition captured at various points in time. An episode definition may indicate the substantive data value associated with a duration based event, and the data values used to determine a beginning and ending date/time associated with each episode. Database queries that include the episode-based condition may be composed by specifying a desired value for the episode-based condition used in selecting query results.

20 Claims, 7 Drawing Sheets

FIG. 6

VISIT FORMS 600

| ROW | PATIENT ID | ADDRESS | STATE | DATE | ... |
|---|---|---|---|---|---|
| 1 | 1001 | ... | MN | 5/2001 | ... |
| 2 | 1001 | ... | MN | 6/2001 | ... |
| 3 | 1001 | ... | MN | 2/2002 | ... |
| 4 | 1001 | ... | CA | 3/2002 | ... |
| 5 | 1001 | ... | CA | 7/2004 | ... |
| 6 | 1001 | ... | NC | 1/2005 | ... |
| 7 | ... | ... | ... | ... | ... |

FIG. 7

ADDRESS EPISODE TABLE 700

| EPISODE NUMBER | FOREIGN KEY (PATIENT ID) | EARLIEST START | LATEST START | EARLIEST STOP | LATEST STOP | EPISODE STATE |
|---|---|---|---|---|---|---|
| 1 | 1001 | "UNKNOWN" | 5/2001 | 2/2002 | 3/2002 | MN |
| 2 | 1001 | 2/2002 | 3/2002 | 7/2004 | 1/2005 | CA |
| 3 | 1001 | 7/2004 | 1/2005 | "UNKNOWN" | "UNKNOWN" | NC |

CREATION OF DURATION EPISODES FROM SINGLE TIME EVENTS

CROSS-REFERENCE TO RELATED APPLICATIONS

This application is related to the following: commonly assigned, co-pending, U.S. patent application Ser. No. 10/083,075, filed Feb. 26, 2002, titled "Application Portability and Extensibility through Database Schema and Query Abstraction;" commonly assigned, co-pending U.S. patent application Ser. No. 10/403,356, filed Mar. 31, 2003, titled "Dealing with Composite Data through Data Model Entities;" and commonly assigned, co-pending application titled "Abstract Query Plan," Ser. No. 11/005,418, filed Dec. 6, 2004, each of which is incorporated by reference herein in its entirety.

BACKGROUND OF THE INVENTION

1. Field of the Invention

The present invention generally relates to computer database systems. More particularly, the invention relates to methods for composing and processing a database query that includes generating event duration episodes from a collection of individual data samples.

2. Description of the Related Art

Computer databases are well known systems used to store, maintain, and retrieve data. Generally, a database provides a collection of data that is organized in a manner to allow its contents to be accessed, managed, and updated. The most prevalent type of database used today is the relational database, which organizes data using relationships defined among a group of tables. For example, the DB2® family of RDBMS products (relational database management system) available from International Business Machines (IBM) provide a sophisticated commercial implementation of a relational database.

Tables in a relational database include one or more columns. Each column typically specifies a name and a data type (e.g., integer, float, string, etc.), and is used to store a common element of data. For example, a table storing data related to patients may reference each patient using a patient identification number stored in a "patient ID" column. Data from each row of such a table is related to the same patient, and table rows are generally referred to as "records." Tables that share at least one element in common (e.g., the patient ID column) are said to be "related." Additionally, tables without a common data element may be related through other tables that do share such elements.

A relational database query may specify which columns to retrieve data from, how to join columns from multiple tables to form a query result, and any conditions that must be satisfied for a particular data record to be included in a query result set. Current relational databases typically process queries composed in an exacting format specified by a query language. For example, the widely used query language SQL (short for Structured Query Language) is supported by virtually every database product available today. An SQL query is composed from one or more clauses set off using specific keywords. Composing a proper SQL query, however, requires a user to understand the structure and content of the relational database (i.e., a schema of tables and columns) as well as the complex syntax of the SQL query language. This complexity often makes it difficult for average users to compose relational database queries.

Database records typically capture a snapshot of a data value recorded for a particular point in time. For example, lab test samples may be recorded with the date and time when the tests are performed or when results are received. Thus, a database record may accurately reflect that a particular patient's hemoglobin test result was "16" on the $5^{th}$ of December at 4:15 pm. Some events, however, have a duration period associated with them, or may continue over a period of time. For example, a patient's home address may be valid over a period of weeks, months, or years. The records in a database table may only capture this information using a sampling of the address taken at various points in time. For example, each time a patient visits a doctor's office, the patient is usually asked to confirm or change their address. If an address has changed, a new address may be recorded in the database. However, an ambiguity now exists. Time between office visits may span days, weeks or even years. Once a patient identifies a new address during an office visit, then for the duration from the last office visit to a current one, the clinic may not have any reliable information regarding whether the patient's address changed the day after the last visit, the day before the current visit, or any number of times in between.

At the same time, knowing when (or for how long) an individual may have lived at a specific location may be useful for certain research issues. For example, causation is a major area of medical research, and determining the cause of a condition often requires analyzing when and for how long certain events occurred. Thus, an individual's home address may be useful to help determine or identify the causes of conditions that are aggravated by environmental factors. Accordingly, users may wish to compose a database query with a logically simple condition such as "state residence=Minnesota." However, directly evaluating conditions such as this may not be possible, as the period (or episode) during which an individual lived at a specific address is usually only sampled at certain points of time, without any indication of when an individual may have moved from one address to another. As a result, composing a database query that will return records based on these types of intuitive conditions is often too complex for an average user. Moreover, even skilled users must switch their focus from analyzing a particular problem to figuring out how to compose a query that will retrieve the desired information from the database.

Accordingly, there is a need for a database query application that allows users to more easily compose a database query that includes conditions based on duration-based episodes, even though a database may only record a collection of snapshots, or samplings, that reflect the value of the episode captured for a particular point in time.

SUMMARY OF THE INVENTION

One embodiment of the invention includes a computer-implemented method for processing a database query. The method generally includes, receiving the database query, wherein the database query includes an episode based condition, wherein a database stores a plurality of data values, each representing a value for the episode based condition captured at a specific point in time, and wherein an episode generation definition identifies data used to determine a beginning and an ending time associated with a set of episodes. The method generally further includes generating a data structure, according to the episode generation definition, that includes a set of episodes generated from the plurality of data values, wherein each episode identifies a value for the episode, a beginning date for the episode, and an ending date for the episode, and evaluating the episode based condition based on the set of episodes to identify a set of query results that includes data that satisfies the database query, including the episode based condition.

Another embodiment of the invention includes a computer-readable medium containing a program which, when executed, performs an operation for processing a database query. The operation generally includes receiving the database query, wherein the database query includes an episode based condition, wherein a database stores a plurality of data values, each representing a value for the episode based condition captured at a specific point in time, and wherein an episode generation definition identifies data used to determine a beginning and an ending time associated with a set of episodes. The operation generally further includes, generating a data structure, according to the episode generation definition, that includes data related to a set of episodes generated from the plurality of data values, wherein each episode identifies a value for the episode, a beginning date for the episode, and an ending date for the episode, and evaluating the episode based condition based on the set of episodes to identify a set of query results that includes data that satisfies the database query, including the episode based condition.

Another embodiment of the invention includes a computing device. The computing device generally includes a processor and a database, wherein a database stores a plurality of data values, each representing a value for the episode based condition captured at a specific point in time, and wherein an episode generation definition identifies data used to determine a beginning and an ending time associated with a set of episodes. The computing device generally includes a memory configured to store an application that includes instructions which, when executed by the processor, cause the processor to perform an operation for processing a database query. The operation generally includes receiving the database query, wherein the database query includes an episode based condition, wherein a database stores a plurality of data values, each representing a value for the episode based condition captured at a specific point in time, and wherein an episode generation definition identifies data used to determine a beginning and an ending time associated with a set of episodes. The operation generally further includes, generating a data structure, according to the episode generation definition, that includes data related to a set of episodes generated from the plurality of data values, wherein each episode identifies a value for the episode, a beginning date for the episode, and an ending date for the episode, and evaluating the episode based condition based on the set of episodes to identify a set of query results that includes data that satisfies the database query, including the episode based condition.

BRIEF DESCRIPTION OF THE DRAWINGS

So that the manner in which the above recited features of the invention can be understood, a more particular description of the invention, briefly summarized above, may be had by reference to the exemplary embodiments that are illustrated in the appended drawings. Note, however, that the appended drawings illustrate only typical embodiments of this invention and should not, therefore, be considered limiting of its scope, for the invention may admit to other equally effective embodiments.

FIG. 6 illustrates an exemplary database table that includes a set of data sample points related to an episode based event, according to one embodiment of the invention.

FIG. 7 illustrates an exemplary database table that includes a set of duration-based episode records, according to one embodiment of the invention.

DETAILED DESCRIPTION OF THE PREFERRED EMBODIMENTS

Figure 1:
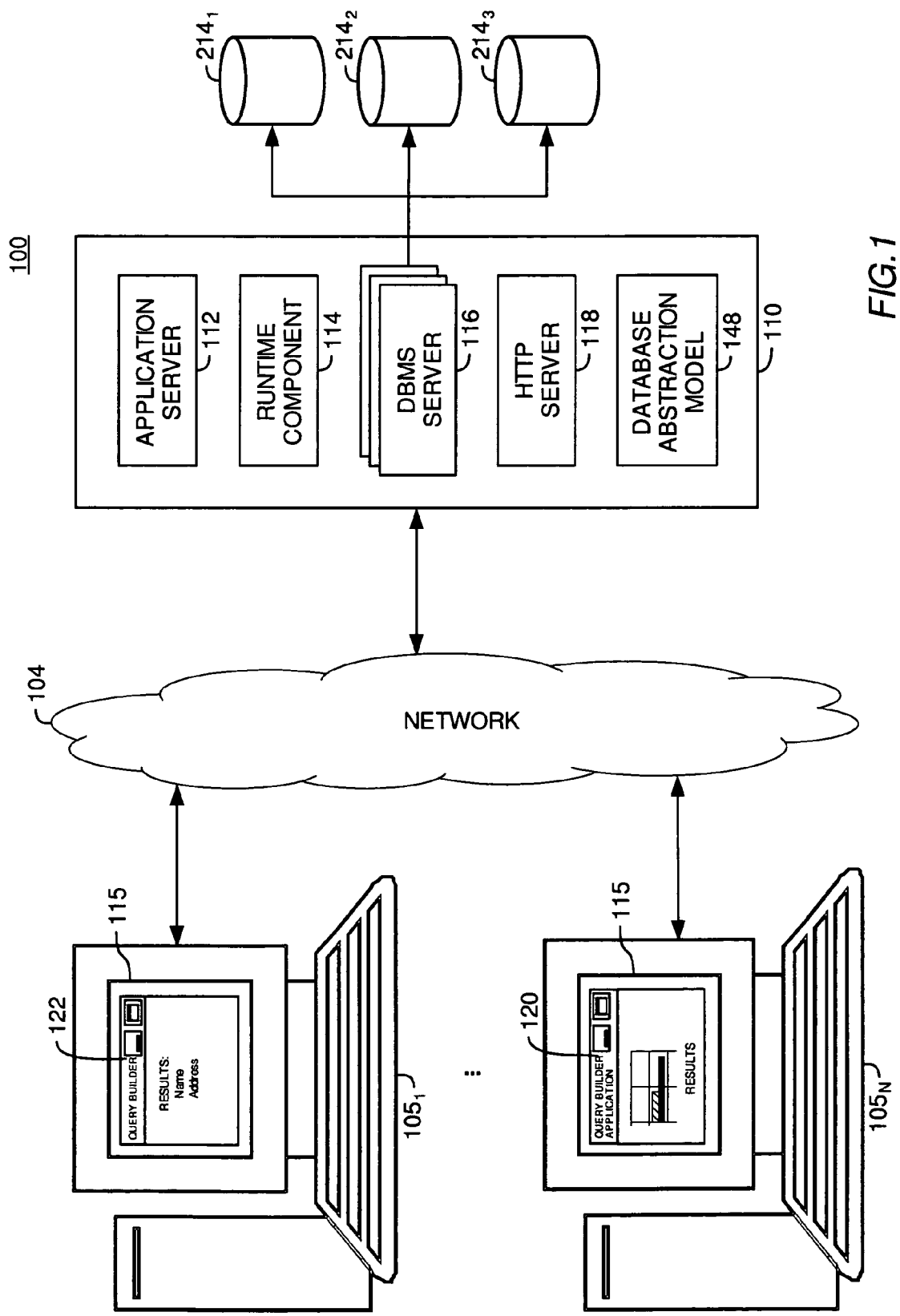
FIG. 1 illustrates an exemplary computing and data communications environment, according to one embodiment of the invention.

Embodiments of the invention generally provide a method, apparatus, and article of manufacture for processing a database query that includes an episode-based condition. More specifically, embodiments may be used to determine a set of duration episodes for a specified event by analyzing a set of data values that each reflect a value for the event at a specific point in time. As used herein, an episode refers to a period of time where a given value accurately describes a condition as being true (or false). For example, a period of time where an individual lived at a particular address, city, or state could be defined as a duration-based episode.

In one embodiment, each episode identified from the collection of data values may be stored in a temporary table generated as part of processing a database query. Each record in the temporary table may reflect a different episode, and each episode may have several points in time associated with it. For example, an episode may be characterized by an episode value (i.e., the substantive value for an instance of the episode), the earliest and latest possible start times when an episode started, and the earliest and latest possible stop times when the episode ended. Consider, for example, a patient's home address for which each the episode may be reflected by the actual street address, a date reflecting the earliest (known) date the patient could have moved to the address, the latest (known) date a patient could have moved to the address, the earliest date patient could have moved from the address, and the latest date that a patient could have moved from the address.

In one embodiment, a data abstraction model is used to provide a query application for users to compose a data query. As described in detail below, a data abstraction model provides a query building interface focused on the substantive content of a particular database, independent from the particular manner of data representation used by the database. Thus, the data abstraction model exposes data to users in an intuitive manner, and users may compose and submit queries without an understanding of the underlying storage mechanism (e.g., a relational schema). Although embodiments of the invention are described relative to a data abstraction model, the invention is not limited to such, and the invention may be adapted to database query applications that do not rely on a data abstraction model as described herein.

The following description references embodiments of the invention. The invention, however, is not limited to any specifically described embodiment; rather, any combination of the following features and elements, whether related to a described embodiment or not, implements and practices the invention. Moreover, in various embodiments the invention provides numerous advantages over the prior art. Although embodiments of the invention may achieve advantages over other possible solutions and the prior art, whether a particular advantage is achieved by a given embodiment does not limit the scope of the invention. Thus, the following aspects, features, embodiments and advantages are illustrative of the invention and are not considered elements or limitations of the appended claims; except where explicitly recited in a claim. Similarly, references to "the invention" should neither be construed as a generalization of any inventive subject matter disclosed herein nor considered an element or limitation of the appended claims; except where explicitly recited in a claim.

One embodiment of the invention is implemented as a program product for use with a computer system such as, for example, the computer system 100 shown in FIG. 1 and described below. The program product defines functions of the embodiments (including the methods) described herein and can be contained on a variety of computer readable media. Illustrative computer readable media include, without limitation, (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed across communications media, (e.g., a computer or telephone network) including wireless communications. The latter embodiment specifically includes information shared over the Internet or other computer networks. Such computer readable media, when carrying computer-readable instructions that perform methods of the invention, represent embodiments of the present invention.

In general, software routines implementing embodiments of the invention may be part of an operating system or part of a specific application, component, program, module, object, or sequence of instructions such as an executable script. Such software routines typically comprise a plurality of instructions capable of being performed using a computer system. Also, programs typically include variables and data structures that reside in memory or on storage devices as part of their operation. In addition, various programs described herein may be identified based upon the application for which they are implemented. Those skilled in the art recognize, however, that any particular nomenclature or specific application that follows facilitates a description of the invention and does not limit the invention for use solely with a specific application or nomenclature. Furthermore, the functionality of programs described herein using discrete modules or components interacting with one another. Those skilled in the art recognize, however, that different embodiments may combine or merge such components and modules in a variety of ways.

Moreover, examples described herein reference medical research environments. These examples are provided to illustrate embodiments of the invention, as applied to one type of data environment. The techniques of the present invention, however, are contemplated for any data environment including, for example, transactional environments, financial environments, research environments, accounting environments, legal environments, and the like. FIGS. 1–2 illustrate an embodiment of the database abstraction model created for an underlying physical data representation. FIGS. 3–7 then illustrate an example of processing an abstract query that includes an episode based condition.

The Database Abstraction Model: Physical View of the Environment

FIG. 1 illustrates a networked computer system using a client-server configuration. Client computer systems $105_{1-N}$ include an interface that enables network communications with other systems over network 104. The network 104 may be a local area network where both the client system 105 and server system 110 reside in the same general location, or may be network connections between geographically distributed systems, including network connections over the Internet. Client system 105 generally includes a central processing unit (CPU) connected by a bus to memory and storage (not shown). Each client system 105 is typically running an operating system configured to manage interaction between the computer hardware and the higher-level software applications running on client system 105 (e.g., a Linux® distribution, Microsoft Windows®, IBM's AIX® or OS/400®, FreeBSD, and the like). (Note, "Linux" is a registered trademark of Linus Torvalds in the United States and other countries.)

The server system 110 may include hardware components similar to those used by client system 105. Accordingly, the server system 110 generally includes a CPU, a memory, and a storage device, coupled by a bus (not shown). The server system 110 is also running an operating system, (e.g., a Linux® distribution, Microsoft Windows®, IBM's OS/400® or AIX®, FreeBSD, and the like).

The environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

In one embodiment, users interact with the server system 110 using a graphical user interface (GUI) provided by interface 115. In a particular embodiment, GUI content may comprise HTML documents (i.e., web-pages) rendered on a client computer system 105, using web-browser 122. In such an embodiment, the server system 110 includes a Hypertext Transfer Protocol (HTTP) server 118 (e.g., a web server such as the open source Apache web-sever program or IBM's Web Sphere® program) configured to respond to HTTP requests from the client system 105 and to transmit HTML documents to client system 105. The web-pages themselves may be static documents stored on server system 110 or generated dynamically using application server 112 interacting with web-server 118 to service HTTP requests. Alternatively, client application 120 may comprise a database front-end, or query application program running on client system 105$_N$. The web-browser 122 and application 120 may be configured to allow a user to compose an abstract query, and to submit the query to the runtime component 114 for processing.

As illustrated in FIG. 1, server system 110 may further include runtime component 114, DBMS server 116, and database abstraction model 148. In one embodiment, these components may be provided using software applications executing on the server system 110. The DBMS server 116 includes a software application configured to manage databases 214$_{1-3}$. That is, the DBMS server 116 communicates with the underlying physical database system, and manages the physical database environment behind the database abstraction model 148. Users interact with the query interface 115 to compose and submit an abstract query to the runtime component 114 for processing. Typically, users compose an abstract query from the logical fields defined by the database abstraction model 148. Logical fields and access methods are described in greater detail below in reference to FIGS. 2A–2B.

In one embodiment, the runtime component 114 receives the abstract query and generates a resolved query of underlying physical databases 214. For example, the runtime component 114 may be configured to generate one or more SQL queries from an abstract query. The resolved queries generated by the runtime component 114 may be executed by DBMS server 116. Additionally, the runtime component 114 may be configured to determine a set of duration-based episodes from a set of data samples where each data sample indicates a value for the event recorded for a particular point in time.

The Database Abstraction Model: Logical View of the Environment

Figure 2A:
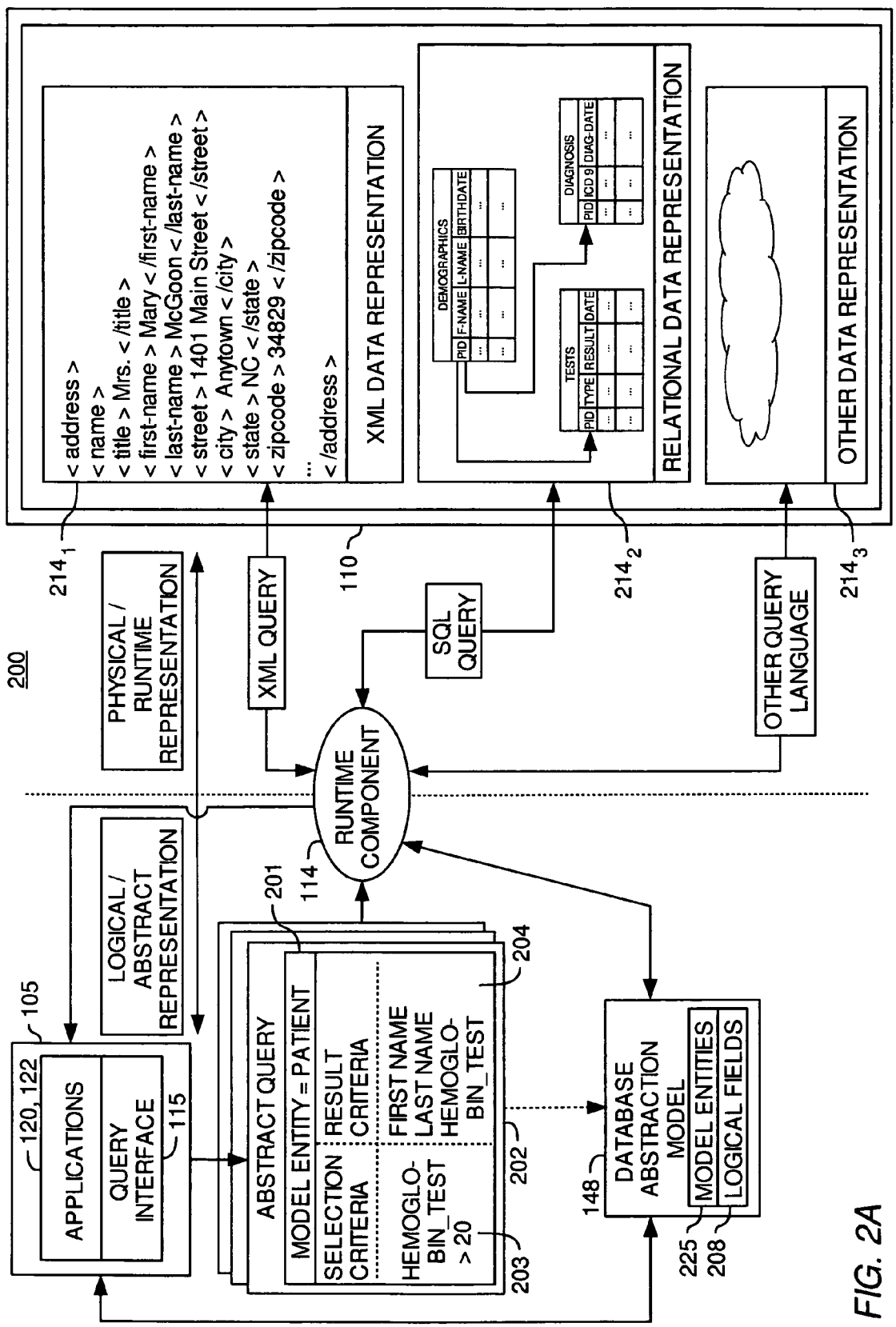
FIG. 2A illustrates a logical view of a database abstraction model constructed for an underlying physical database, according to one embodiment of the invention.

FIG. 2A illustrates a plurality of interrelated components of a database abstraction model, along with relationships between the logical view of data provided by the abstraction model environment (the left side of FIG. 2A), and the underlying physical database used to store the data (the right side of FIG. 2A).

In one embodiment, the database abstraction model 148 defines a set of logical fields 208 and model entities 225. Users compose an abstract query 202 by specifying selection criteria 203 and result fields 204. An abstract query 202 may also identify a model entity 201 from the set of model entities 225. The resulting query is generally referred to herein as an "abstract query" because it is composed using logical fields 208 rather than direct references to data structures in the underlying physical databases 214. The model entity 225 may be used to indicate the general focus of the abstract query 202 (e.g., a "patient", a "person", an "employee", a "test", a "facility" etc). Model entities are further described in commonly assigned, co-pending application Ser. No. 10/403,356, filed Mar. 31, 2003, titled "Dealing with Composite Data through Data Model Entities," incorporated herein by reference in its entirety.

Illustratively, abstract query 202 includes an indication of that the query is directed to instances of the "patient" model entity 201, and further includes selection criteria 203 indicating that patients with a "hemoglobin_test>20" should be retrieved. The selection criteria 203 are composed by specifying a condition evaluated against the data values corresponding to a logical field 208 (in this case the "hemoglobin_test" logical field. The operators in a condition typically include comparison operators such as =, >, <, >=, or, <=, and logical operators such as AND, OR, and NOT. Result fields 204 indicates that data retrieved for this abstract query 202 includes data for the "name," "age," and "hemoglobin_test" logical fields 208.

In one embodiment, users compose an abstract query 202 using query building interface 115. The interface 115 may be configured to allow users to compose an abstract query 202 from the logical fields 208. The definition for each logical field 208 in the database abstraction model 148 specifies an access method. The access method defined for a logical field may be used to map from the logical view of data exposed to a user interacting with the interface 115 to the physical view of data used by the runtime component 114 to retrieve data from the physical databases 214. Thus, the runtime component 114 retrieves data from the physical database 214 by generating a resolved query (e.g., an SQL statement) from the abstract query 202.

Further, depending on the access method specified for a logical field, the runtime component 114 may generate a query of many different underlying storage mechanisms, and a given database abstraction model may refer to data in multiple underlying databases. For example, for a given logical field, the runtime component may be generate an XML query that queries data from database 214$_1$, an SQL query of relational database 214$_2$, or other query composed according to another physical storage mechanism using "other" data representation 214$_3$, or combinations thereof (whether currently known or later developed).

Figure 2B:
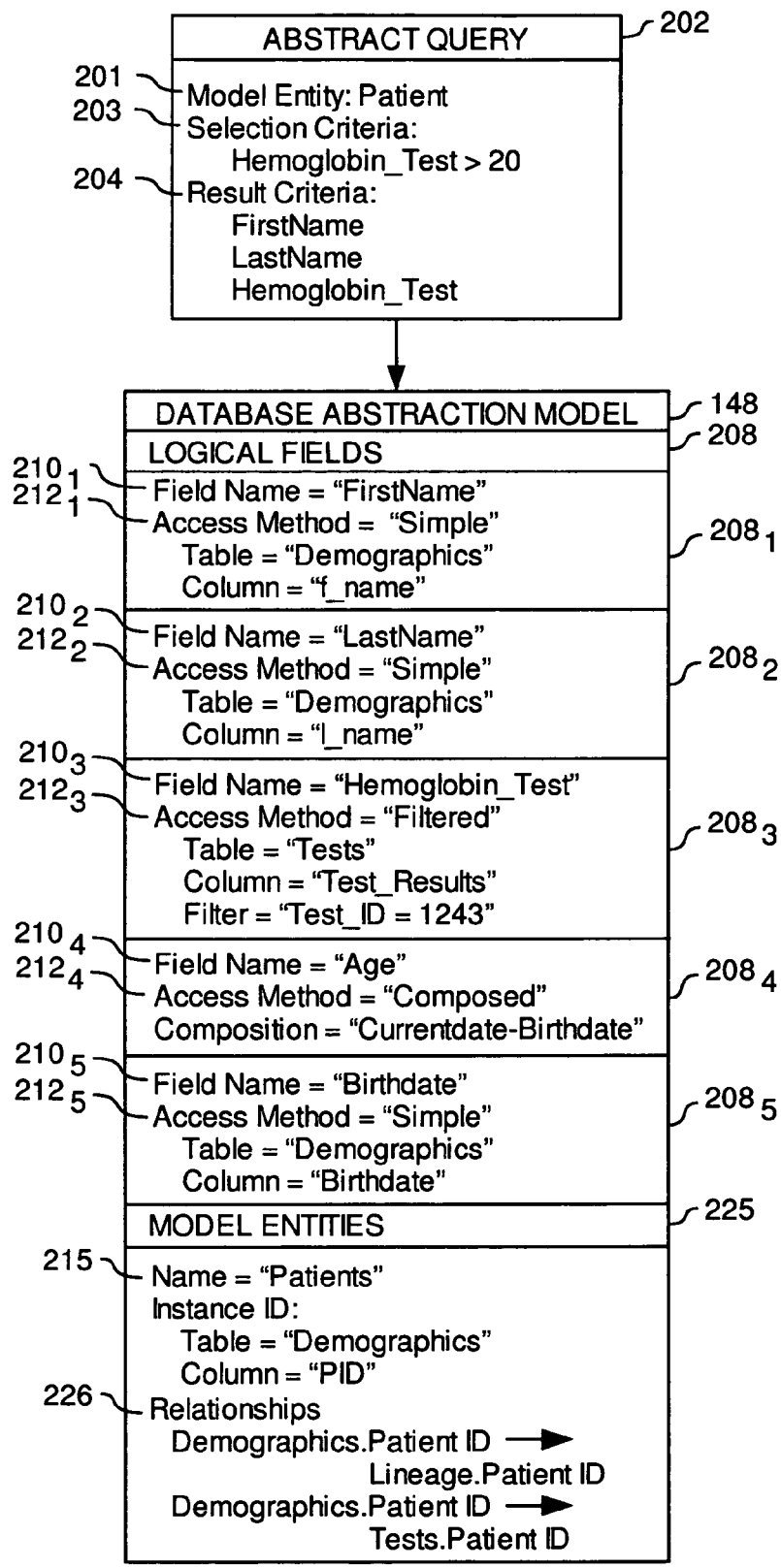
FIG. 2B illustrates an exemplary abstract query and database abstraction model, according to one embodiment of the invention.

FIG. 2B illustrates an exemplary abstract query 202, relative to the database abstraction model 148, according to one embodiment of the invention. The query includes selection criteria 203 indicating that the query should retrieve instances of the patient model entity 201 with a "hemoglobin" test value greater than "20." The particular information retrieved using abstract query 202 is specified by result fields 204. In this example, the abstract query 202 retrieves a patient's name and a test result value for a hemoglobin test. The actual data retrieved may include data from multiple tests. That is, the query results may exhibit a one-to-many relationship between a particular model entity and the query results.

An illustrative abstract query corresponding to abstract query 202 is shown in Table I below. In this example, the abstract query 202 is represented using eXtensible Markup Language (XML). In one embodiment, application 115 may be configured to generate an XML document to represent an abstract query composed by a user interacting with the query building interface 115. Those skilled in the art will recognize that XML is a well known markup language used to facilitate the sharing of structured text and information; other markup languages, however, may be used.

TABLE I

Abstract Query Example - XML

```
001    <?xml version="1.0"?>
002    <!--Query string representation: ("Hemoglobin_test > 20") -->
003    <QueryAbstraction>
004       <Selection>
005          <Condition>
006             <field="Hemoglobin Test" operator="GT" value="20"/>
007          </Condition>
008       </Selection>
009       <Results>
010          <Field name="FirstName"/>
011          <Field name="LastName"/>
012          <Field name="hemoglobin_test"/>
013       </Results>
```

TABLE I-continued

Abstract Query Example - XML

```
014      <Entity name="patient">
015          <Field Refname="data://demographics/PatientID" />
016          <Usage type="query" />
017      </EntityField>
018      </Entity>
020  </QueryAbstraction>>
```

The XML markup shown in Table I includes the selection criteria 203 (lines 004–008) and the results criteria 204 (lines 009–013). Selection criteria 203 includes a field name (for a logical field), a comparison operator (=, >, <, etc) and a value expression (what the field is being compared to). In one embodiment, the result fields 204 include a set of logical fields for which data should be returned. The actual data returned is consistent with the selection criteria 203. Line 13 identifies the model entity selected by a user, in this example, a "patient" model entity. Thus, the query results returned for abstract query 202 are instances of the "patient" model entity. Line 15 indicates the identifier in the physical database 214 used to identify instances of the model entity. In this case, instances of the "patient" model entity are identified using values from the "Patient ID" column of a demographics table.

After composing an abstract query, a user may submit it to runtime component 114 for processing. In one embodiment, the runtime component 114 may be configured to process the abstract query 202 by generating an intermediate representation of the abstract query 202, such as an abstract query plan. An abstract query plan is composed from a combination of abstract elements from the data abstraction model and physical elements relating to the underlying physical database. For example, an abstract query plan may identify which relational tables and columns are referenced by the access methods of the logical fields included in the abstract query. The runtime component may then parse the intermediate representation in order to generate a physical query of the underlying physical database (e.g., an SQL statement(s)). Abstract query plans and query processing are further described in a commonly assigned, co-pending application entitled "Abstract Query Plan," Ser. No. 11/005,418, filed Dec. 6, 2004, which is incorporated by reference herein in its entirety.

FIG. 2B further illustrates an embodiment of a database abstraction model 148 that includes a plurality of logical field specifications $208_{1-5}$ (five shown by way of example). The access methods included in a given logical field specification 208 (or logical field, for short) provide mapping for the logical field 208 to tables and columns in an underlying relational database (e.g., database $214_2$ shown in FIG. 2A). As illustrated, each field specification 208 identifies a logical field name $210_{1-5}$ and an associated access method $212_{1-5}$. Depending upon the different types of logical fields, any number of access methods may be supported by the database abstraction model 148. FIG. 2B illustrates access methods for simple fields, filtered fields, and composed fields. Each of these three access methods are described below.

A simple access method specifies a direct mapping to a particular entity in the underlying physical database. Field specifications $208_1$, $208_2$, and $208_5$ each provide a simple access method, $212_1$, $212_2$, and $212_5$, respectively. For a relational database, the simple access method maps a logical field to a specific database table and column. For example, the simple field access method $212_1$ shown in FIG. 2B maps the logical field name $210_1$ "FirstName" to a column named "f_name" in a table named "Demographics."

Logical field specification $208_3$ exemplifies a filtered field access method $212_3$. Filtered access methods identify an associated physical database and provide rules defining a particular subset of items within the underlying database that should be returned for the filtered field. Consider, for example, a relational table storing test results for a plurality of different medical tests. Logical fields corresponding to each different test may be defined, and a filter for each different test is used to associate a specific test with a logical field. For example, logical field $208_3$ illustrates a hypothetical "hemoglobin test." The access method for this filtered field $212_3$ maps to the "Test_Result" column of a "Tests" tests table and defines a filter "Test_ID='1243.'" Only data that satisfies the filter is returned for this logical field. Accordingly, the filtered field $208_3$ returns a subset of data from a larger set, without the user having to know the specifics of how the data is represented in the underlying physical database, or having to specify the selection criteria as part of the query building process.

Field specification $208_4$ exemplifies a composed access method $212_4$. Composed access methods generate a return value by retrieving data from the underlying physical database and performing operations on the data. In this way, information that does not directly exist in the underlying data representation may be computed and provided to a requesting entity. For example, logical field access method $212_4$ illustrates a composed access method that maps the logical field "age" $208_4$ to another logical field $208_5$ named "birthdate." In turn, the logical field "birthdate" $208_5$ maps to a column in a demographics table of relational database $214_2$. In this example, data for the "age" logical field $208_4$ is computed by retrieving data from the underlying database using the "birthdate" logical field $208_5$, and subtracting a current date value from the birth date value to calculate an age value returned for the logical field $208_4$. Another example includes a "name" logical field (not shown) composed from the first name and last name logical fields $208_1$ and $208_2$.

By way of example, the field specifications 208 shown in FIG. 2B are representative of logical fields mapped to data represented in the relational data representation $214_2$. However, other instances of the data repository abstraction component 148 or, other logical field specifications, may map to other physical data representations (e.g., databases $214_1$ or $214_3$ illustrated in FIG. 2A). Further, in one embodiment, the database abstraction model 148 is stored on computer system 110 using an XML document that describes the model entities, logical fields, access methods, and additional metadata that, collectively, define the database abstraction model 148 for a particular physical database system. Other storage mechanisms or markup languages, however, are also contemplated.

Model entity section 225 includes a definition for the "patient" model entity. Illustratively, the "patient" model entity 225 is defined with a name (for the model entity: "patient") and an instance identifier 215 used to distinguish between instances of the patient model entity. Model entity relationships section 226 identifies data available in database 214 that is related to instances of the "patient" model entity. For example, the first model entity relationship indicates that data from a row of the demographics table and the linage table that share a common "patient ID" store data about the same instance of the "patient" model entity. Collectively, relationships section 226 defines the "universe" of data about the model entity captured by the underlying physical database 214.

The Database Abstraction Model: Episode-Based Logical Fields

As described above, the database abstraction model provides a query environment where database users compose database queries according to a logical understanding of the data being queried and the intuitive logical relationships among different data elements. Thus, users create queries about substantive entities (e.g., to find patients that fit a particular profile), instead of composing queries based on a particular physical representation (e.g. by specifying the tables and columns of a relational database). Because the database abstraction model 148 is not tied to the underlying representation of the physical database 214 or to the syntax of a particular query language, additional capabilities may be provided by the database abstraction model 148 without having to modify the underlying database.

FIGS. 3–7 illustrate an extension to the database abstraction model configured to process a logical field that specifies an "episode based" access method. As described above, an episode refers to a period of time where a given value accurately describes a condition as being true (or false), and an "episode" may be characterized by different points in time such as an earliest possible start time, a latest possible start time, an earliest possible stop time, and a latest possible stop time for which the condition is true (or false). In the example illustrated in FIGS. 3–7, a "state_history" logical field 208 is used to generate a temporary table of episodes that each reflect a state of residence for a given individual, along with start and end dates for each episodes. The data values used to generate the temporary table are provided by an address reported an individual during each visit to a doctor's office.

Figure 3:
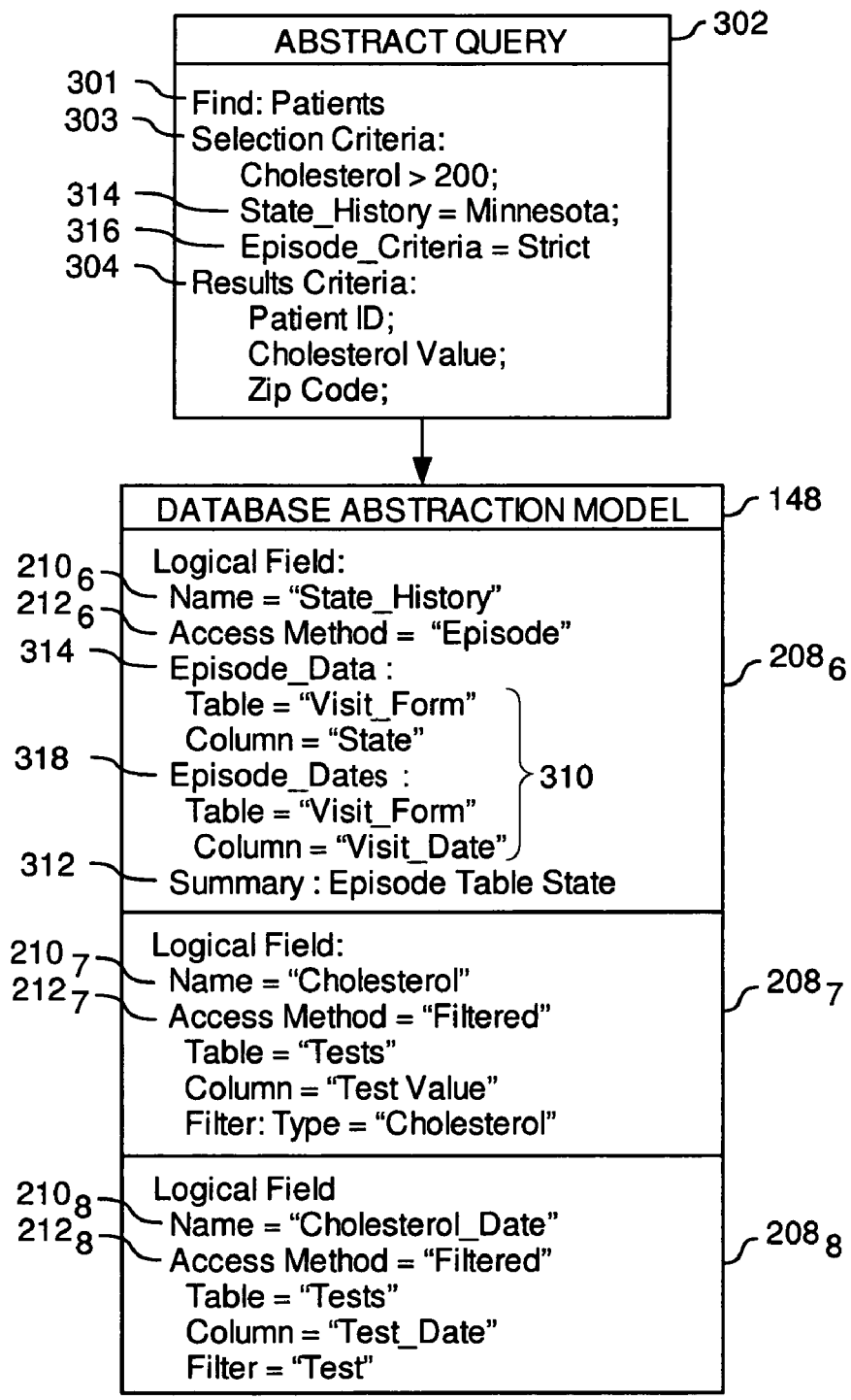
FIG. 3 illustrates another abstract query and database abstraction model, according to one embodiment of the invention.

First, FIG. 3 illustrates a second abstract query 302 and a continuation of the database abstraction model 148 illustrated in FIG. 2. Like abstract query 202, abstract query 303 specifies to return instances of the patient model entity 301, according to the selection criteria 303. Results criteria 304 specify what data should be included in query results. As shown, selection criteria 303 includes a condition based on the "cholesterol_test" logical field $208_7$ and a condition 314 based on a "state_history" logical field $208_6$. In one embodiment, a query that includes an episode-based condition may also specify how conservative, or strict, the runtime component 114 should be in evaluating the condition. For example, using the earliest possible start time and latest possible stop for each episode may make give the broadest possible endpoints for defining an episode. Alternatively, using the latest possible start time and the earliest possible stop time gives the strictest definition of an episode. In one embodiment, this qualification of strictness is implemented with an episode selectivity setting. In the present example, the "state_history" episode selectivity setting 316 is shown as being is set to "strict." The result of this setting is used in query processing to determine whether some event occurred within (or outside of) a particular episode. Table II shows abstract query 302 set forth in a prose format.

TABLE II

Abstract Query Example

Find: patients with a <u>cholesterol test</u> greater than "200" and <u>state history</u> equal to "Minnesota"
Return: <u>patient ID</u>, <u>cholesterol test result</u>, <u>state history</u>

Each underlined phrase in Table II corresponds to a logical field provided by database abstraction model 148. The first element listed in Table II specifies the selection criteria 203 for this abstract query and also specifies that the patient model entity is the focus of this abstract query. The second element lists the patient ID, cholesterol test result, and state_history logical fields that should be returned for each instance of the patient model entity that satisfies the selection criteria.

FIG. 3 also illustrates the database abstraction model 148 (continued from FIG. 2) shown with three additional logical fields 208. The cholesterol logical field $208_7$ and cholesterol_date $208_8$ logical field each reflect a filtered field with access methods $212_7$ and $212_8$. These access methods map logical fields $208_{7-8}$ to data regarding cholesterol test results stored in a tests table, filtered by the test type value of "cholesterol."

Logical field $208_6$ illustrates an example of an "episode-based" logical field. As shown, logical field $208_6$ includes a logical field name $210_6$ "state history," and episode generation specification 310. In one embodiment, episode generation specification 310 specifies the substantive data value associated with a duration based event (e.g., episode data 314) and the data values used to generate the beginning and ending date/time associated with each episode (e.g., episode date 318). In this case, episode generation specification 310 indicates that the episode data 314 for the "state history" episodes are based on data from the "state" column of a "visit_form" table in the underlying physical data representation. In addition, episode dates 318 specify that time/date values used to create a set of episodes from episode data 314 are stored in a "visit_date" column of the "visit_form" table.

In one embodiment, the runtime component 114 may be configured to retrieve data values specified by generation specification 310 and generate a temporary table of episode events. The episodes may be stored in a temporary table specified by table specification 312. In one embodiment temporary table 312 includes a single record (row) for each duration episode generated from the episode data 314. An example of both the episode data 314 and 318 and the resulting temporary episode data 312 are described below in conjunction with FIGS. 6 and 7.

Figure 4:
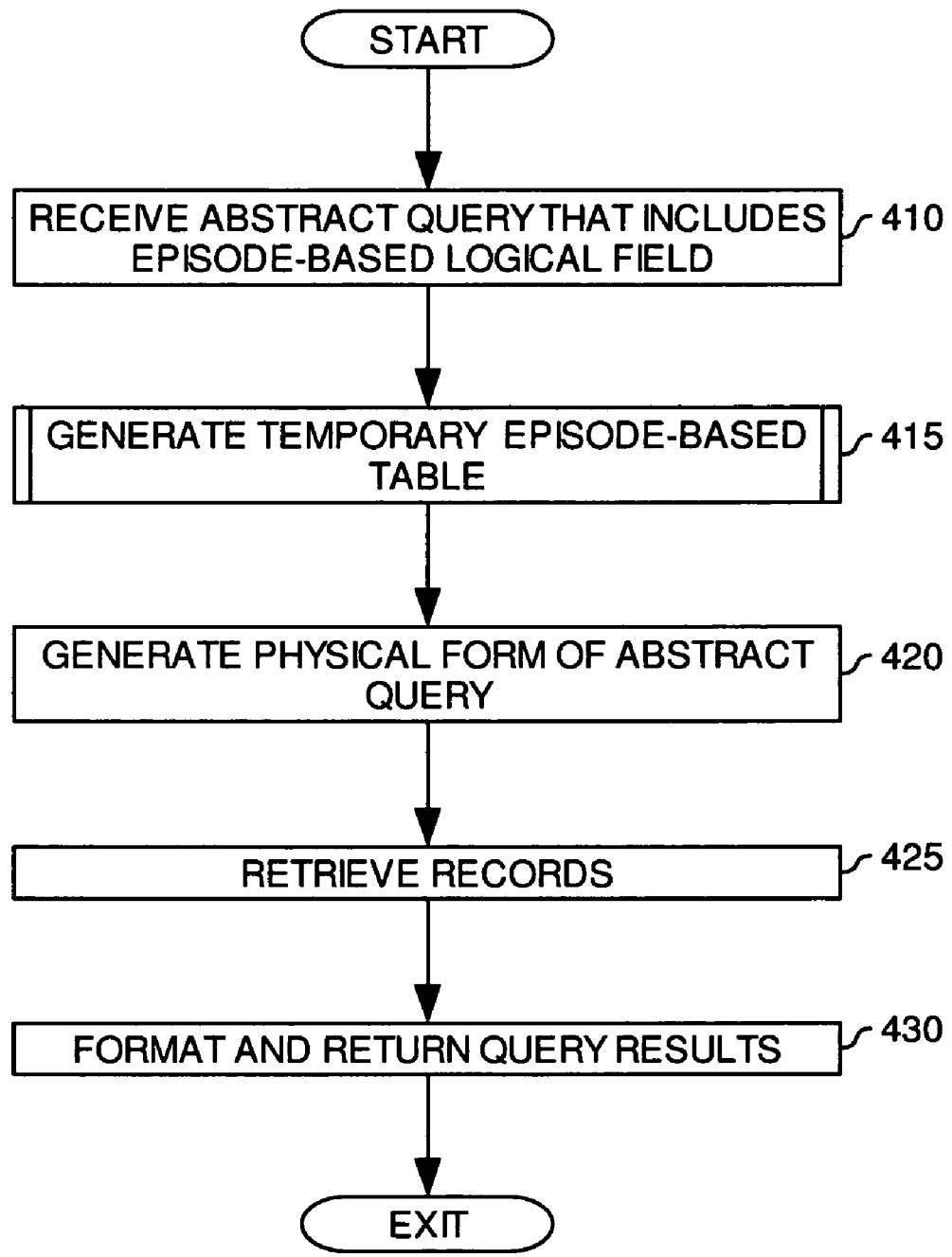
FIG. 4 illustrates a method for processing an abstract query that includes an episode based logical field, according to one embodiment of the invention.
Figure 5:
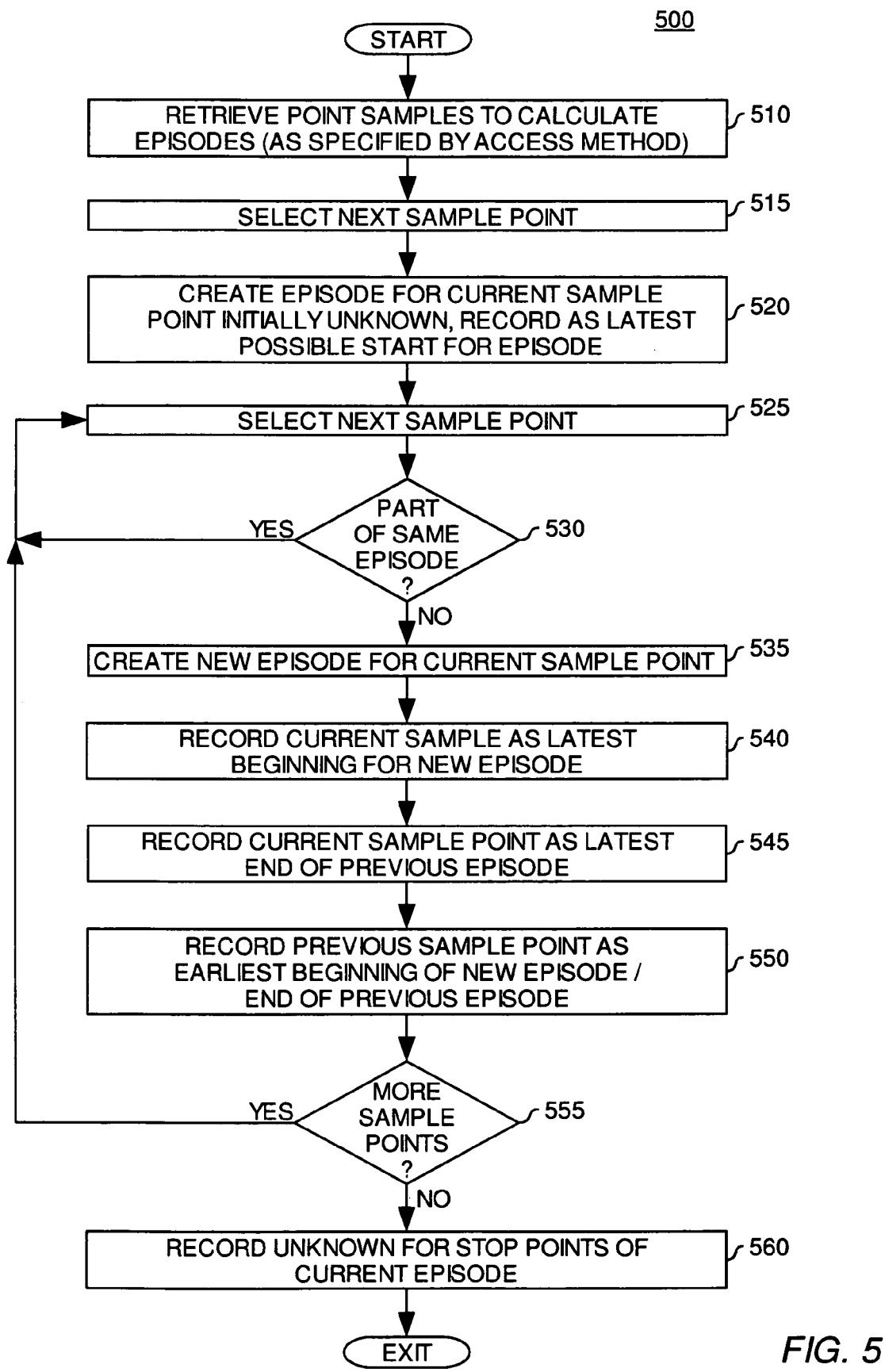
FIG. 5 illustrates a method for generating a set of episode events from a collection of individual data samples, according to one embodiment of the invention.

FIG. 4 illustrates a method for processing an abstract query that includes an episode-based logical field, according to one embodiment of the invention. At step 410, the runtime component 114 receives an abstract query that includes an episode based logical field (e.g., logical field $208_6$). At step 415, the runtime component may generate a temporary episode table used to process the abstract query received in the previous step. In one embodiment, the temporary episode table includes a single record for each episode identified from an episode data 314. Each row of the temporary episode table may also include both a value associated with the episode and the starting/ending dates such as an earliest possible start time, a latest possible start time, an earliest possible stop time, and a latest possible stop time. FIG. 5, discussed below, illustrates a method for generating the temporary episode table in response to receiving the abstract query that includes an episode based logical field.

At step 420, the runtime component 114 may generate a physical query consistent with the underlying data representation 214. For example, the runtime component 114 may generate one ore more SQL queries of database tables of a relational data representation $214_2$. The queries may include references to columns of the temporary table generated in step 415. At step 425, the queries generated at step 420 are executed to retrieve a set of database records that satisfy the selection criteria 203 specified by an abstract query. At step 430, these query result may be formatted and returned to the user submitting the abstract query. In one embodiment, query interface 115 may be configured to display a table that includes the results criteria 304 for each instance of the patient model entity with the specified selection criteria 303. For example, the results table may be formatted using HTML and transmitted to a user over network 104 by web server 118 according to the HTTP communication protocol.

FIG. 5 illustrates a method 500 for generating a temporary episode table from the episode data 314, according to one embodiment of the invention. The operations of the method 500 are described in conjunction with the data tables 600 and 700 illustrated in FIGS. 6 and 7, respectively. FIG. 6 illustrates a table of data points that includes episode data 314 and episode dates 316 used to generate the temporary episode table 312, and FIG. 7 illustrates an exemplary episode table 700 generated therefrom.

The method 500 illustrates operations that may be performed as part of step 415 of the method illustrated in FIG. 4. Accordingly, the method 500 begins after the runtime component 114 has received an abstract query that includes an episode based logical field in the selection criteria 303. The method begins at step 510 where the runtime component retrieves the episode data 314 used to create the temporary episode based table. As described above, the values for episode data 314 reflect a snapshot of the episode value recorded at a specific time. For example, the episode data specification 310 maps logical field $208_6$ to episode data 314 stored in a "visit_forms" table 600 illustrated in FIG. 6. Table 600 includes columns to record a patient ID (column 610), an address (column 620), a state (column 630), and a date (column 640). Additional data that could be recorded on a visit form filled out by a patient may be stored in column 650. As shown, each record of table 600 is related to a patient represented by the patient ID value of "1001." Further, records 660 each reflect a sample point of the episode data 314 where the individual reported an address located in the state of Minnesota. Similarly, records 670 illustrate an address in California value and record 680 illustrates a reported address located in North Carolina. From these individual data sampling points, the runtime component 114 may be configured to generate a temporary episode table that includes a set of duration episode records. In the example being described, each episode is related to an individual's state of residence reported on a visit form.

After retrieving the episode data 314 used to generate the temporary episode table, at step 515 the next sample point is selected. For example, the runtime component 114 may sort the episode data 314 by the episode date values 316. In this example, the data illustrated in table 6 is sorted by date. At step 520, the oldest sample point is used to create an initial episode. Accordingly, using the data illustrated in table 600, the date 5/2001 is used to create an initial episode for the temporary episode table identified by the episode value of "Minnesota."

FIG. 7 illustrates an episode table 700 created from the data stored in the "visit_form" table 600. Illustratively, the initial episode 705 is stored in table 700 by recording an episode number "1" in column 720 and the episode state "MN" in column 750. In addition, table 700 includes earliest possible start date (column 730), a latest possible start date (column 735), an earliest possible stop date (column 740), and a latest possible stop date (column 745). Also at step 520, the episode date associated with the initial sample point is recorded as the latest possible start date for the initial episode record 705 (i.e., the date of 5/2001 associated with the first address record in table 600).

At step 525, a loop begins that includes steps 530 to 555. During each pass through the loop, another sample point is analyzed, and episode table 700 may be modified accordingly. First, at step 535 the next sample point is selected. In this case, after processing the first record of table 600 (the initial sample point), the second record is selected. The second record also reflects "MN" as the state of residence and is associated with a sampling date of date of 6/2001. At step 530, the runtime component 114 determines whether the episode value in the sample point selected at step 525 is the same as the current episode. In this case, both the initial and second sample points record an address located in Minnesota. Accordingly, the method 500 returns to step 525 and selects the third record from table 600 (also part of the "Minnesota" episode). The fourth record from table 600, however, records a residence address located in the state of California. Accordingly, when this record is selected as the next sample point, the method proceeds from step 530 to step 535 and the runtime component 114 creates a new episode to record data for the next episode. Accordingly, record 710 of table 700 is populated with a new episode record (episode "2"). At step 540 the runtime component 114 stores the date of the current sample point as the latest beginning point for the new episode. Accordingly, the value of "3/2002" is recorded in the column 735 for episode "2". At step 545, this date, "3/2002," is also recorded as the latest possible end date of the pervious episode (episode "1"). At step 540, the episode date value associated with the previous sample point (the date of 3/2002 illustrated in row 3 of table 600) is recorded as the earliest beginning of the new episode and the earliest ending of the previous episode.

At step 555, the current sample point has been fully processed, and the runtime component 114 determines whether there are any additional sample points to analyze (e.g., whether additional rows are recorded in table 600). If so, the method returns to step 520 and loops through steps 525 and 530 to identify any additional episodes from the episode data 314. Illustratively, record 680 of table 600 identifies a third episode where an individual has reported an address located in the state of North Carolina. This episode is recorded in row 715 of table 700, and the runtime component proceeds to continue to fill in the records of the temporary episode table 700 according to steps 540, 545 and 550. At step 560, after analyzing the available episode data 314, the runtime component 114 may record an indication of "unknown" for any remaining fields of the current episode. For example, as no further episode data 314 is available from table 600, the data values for the earliest stop date (column 740) and the latest stop date (column 745) may be set to "unknown" for the episode "3" in data record 715

Once completed, the runtime component 114 may compose queries that evaluated against the temporary episode table 700. For example, abstract query 303 includes conditions of "cholesterol>200" and "state history=Minnesota." Using the dates reflected in the earliest possible start time (column 730), a latest possible start time (column 735), an earliest possible stop time (column 740), and a latest possible stop time (column 745) of table 700, the runtime component may compose a very simple query to determine whether a value retrieved for the "cholesterol>200" logical field falls within, or without, of the "MN" episode. In addition, this evaluation may occur with different levels of granularity. As described above, abstract query 303 included a state history selectivity of "strict." In response, the runtime component 114 may include a given "cholesterol>200"

value as within the "MN" episode only if it falls between the 5/2001 and 2/2002 dates reflected in columns 735 and 740 for the "MN" episode 705, That is, the runtime component may determine that a given test value falls within a given episode only if it falls between a latest possible start date and an earliest possible stop dates reflected in the temporary episode table. By choosing other columns to bracket the beginning and ending points, the length of a given episode may grow. Also, portions of successive episodes may overlap with one another. For example, the period between the earliest and latest stop dates for the "MN" episode 705 overlap with the earliest and latest start dates for the "CA" episode 710.

As described, embodiments of the invention allow users to compose database queries based on for an episode based event, event though the underlying database may only record values for the event sampled at various individual points in time. The episode based queries conditions may be used to create logically intuitive queries that may be evaluated based on whether a given data element falls within or without of an episode specified in a query condition. Using these types of conditions, a researcher may be able to identify patters useful in determining cause of a condition that are dependent upon on when and for how long certain a particular episode occurred. Further, although described above using an episode defined relative to periods when a person may have lived at a given address, episodes may be created for any type of data with a persistent existence that is periodically sampled to obtain a current value for the episode.

While the foregoing is directed to embodiments of the present invention, other and further embodiments of the invention may be devised without departing from the basic scope thereof, and the scope thereof is determined by the claims that follow.

What is claimed is:

1. A computer-implemented method for processing a database query, comprising:
   receiving the database query, wherein the database query includes an episode based condition, wherein a database stores a plurality of data values, each representing a value for the episode based condition captured at a specific point in time, and wherein an episode generation definition identifies data used to determine a beginning and an ending time associated with a set of episodes;
   generating a data structure, according to the episode generation definition, that includes a set of episodes generated from the plurality of data values, wherein each episode identifies a value for the episode, a beginning date for the episode, and an ending date for the episode;
   evaluating the episode based condition based on the set of episodes to identify a set of query results that includes data that satisfies the database query, including the episode based condition; and
   outputting the set of query results.

2. The method of claim 1, further comprising returning the set of query results to a user submitting the database query that includes the episode based condition.

3. The method of claim 1, wherein the database query comprises an abstract query composed according to a database abstraction model, wherein the database abstraction model defines a plurality of logical fields, and wherein each logical field specifies an access method selected from at least two different access method types for accessing data in the database associated with the logical field.

4. The method of claim 3, wherein the access method for at least one logical field specifies an episode-based access method and wherein the episode-based access method defines the episode generation definition for the at least one logical field.

5. The method of claim 1, wherein generating a data structure comprises generating a temporary table, wherein each record of the temporary table stores the data identifying a beginning and ending date for an episode.

6. The method of claim 5, wherein the data identifying a beginning and ending date for an episode comprises an earliest possible start time, a latest possible start time, an earliest possible stop time, and a latest possible stop time.

7. The method of claim 1, wherein the database comprises a relational database queried using queries composed in the structured query language (SQL).

8. A computer-readable medium containing a program which, when executed, performs an operation for processing a database query, comprising:
   receiving the database query, wherein the database query includes an episode based condition, wherein a database stores a plurality of data values, each representing a value for the episode based condition captured at a specific point in time, and wherein an episode generation definition identifies data used to determine a beginning and an ending time associated with a set of episodes;
   generating a data structure, according to the episode generation definition, that includes data related to a set of episodes generated from the plurality of data values, wherein each episode identifies a value for the episode, a beginning date for the episode, and an ending date for the episode; and
   evaluating the episode based condition based on the set of episodes to identify a set of query results that includes data that satisfies the database query, including the episode based condition.

9. The computer-readable medium of claim 8, further comprising returning the set of query results to a user submitting the database query that includes the episode based condition.

10. The computer-readable medium of claim 8, wherein the database query comprises an abstract query composed according to a database abstraction model, wherein the database abstraction model defines a plurality of logical fields, and wherein each logical field specifies an access method selected from at least two different access method types for accessing data in the database associated with the logical field.

11. The computer-readable medium of claim 10, wherein the access method for at least one logical field specifies an episode-based access method and wherein the episode-based access method defines the episode generation definition for the at least one logical field.

12. The computer-readable medium of claim 8, wherein generating a data structure comprises generating a temporary table, wherein each record of the temporary table stores the data identifying a beginning and ending date for an episode.

13. The computer-readable medium of claim 12, wherein the data identifying a beginning and ending date for an episode comprises an earliest possible start time, a latest possible start time, an earliest possible stop time, and a latest possible stop time.

14. The computer-readable medium of claim 8, wherein the database comprises a relational database queried using queries composed in the structured query language (SQL).

15. A computing device, comprising:

a processor; and a database, wherein a database stores a plurality of data values, each representing a value for the episode based condition captured at a specific point in time, and wherein an episode generation definition identifies data used to determine a beginning and an ending time associated with a set of episodes a memory configured to store an application that includes instructions which, when executed by the processor, cause the processor to perform operations for processing a database query, comprising:

receiving the database query, wherein the database query includes an episode based condition;

generating a data structure, according to the episode generation definition, that includes data related to a set of episodes generated from the plurality of data values, wherein each episode identifies a value for the episode, a beginning date for the episode, and an ending date for the episode; and evaluating the episode based condition based on the set of episodes to identify a set of query results that includes data that satisfies the database query, including the episode based condition.

16. The computing device of claim 15, further comprising returning the set of query results to a user submitting the database query that includes the episode based condition.

17. The computing device of claim 15, wherein the database query comprises an abstract query composed according to a database abstraction model, wherein the database abstraction model defines a plurality of logical fields, and wherein each logical field specifies an access method selected from at least two different access method types for accessing data in the database associated with the logical field.

18. The computing device of claim 17, wherein the access method for at least one logical field specifies an episode-based access method and wherein the episode-based access method defines the episode generation definition for the at least one logical field.

19. The computing device of claim 15, wherein generating a data structure comprises generating a temporary table, wherein each record of the temporary table stores the data identifying a beginning and ending date for an episode.

20. The computing device of claim 19, wherein the data identifying a beginning and ending date for an episode comprises an earliest possible start time, a latest possible start time, an earliest possible stop time, and a latest possible stop time.

\* \* \* \* \*